(12) United States Patent
Gao et al.

(10) Patent No.: US 11,349,687 B2
(45) Date of Patent: May 31, 2022

(54) PACKET PROCESSING METHOD, DEVICE, AND SYSTEM

(71) Applicant: HUAWEI TECHNOLOGIES CO., LTD., Guangdong (CN)

(72) Inventors: Yuan Gao, Nanjing (CN); Kai Li, Nanjing (CN); Shenyu Ding, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 97 days.

(21) Appl. No.: 16/850,616

(22) Filed: Apr. 16, 2020

(65) Prior Publication Data

US 2020/0244485 A1 Jul. 30, 2020

Related U.S. Application Data

(63) Continuation of application No. PCT/CN2018/110413, filed on Oct. 16, 2018.

(30) Foreign Application Priority Data

Oct. 17, 2017 (CN) .......................... 201710961377.7

(51) Int. Cl.

| H04L 12/46 | (2006.01) |
|---|---|
| H04L 12/721 | (2013.01) |
| H04L 12/723 | (2013.01) |
| H04L 12/773 | (2013.01) |
| H04L 45/50 | (2022.01) |

(Continued)

(52) U.S. Cl.
CPC ...... H04L 12/4633 (2013.01); H04L 12/4641 (2013.01); H04L 45/50 (2013.01); H04L 45/60 (2013.01); H04L 45/66 (2013.01)

(58) Field of Classification Search
CPC . H04L 12/4633; H04L 12/4641; H04L 45/50; H04L 45/60; H04L 45/66
See application file for complete search history.

(56) References Cited

U.S. PATENT DOCUMENTS

| 9,628,409 B1 * | 4/2017 | Yuvaraj ................. H04L 49/201 |
| 10,142,129 B1 * | 11/2018 | Gupta ................. H04L 12/4641 |

(Continued)

FOREIGN PATENT DOCUMENTS

| CN | 101217457 A | 7/2008 |
| CN | 101364927 A | 2/2009 |

(Continued)

*Primary Examiner* — Luat Phung
(74) *Attorney, Agent, or Firm* — Womble Bond Dickinson (US) LLP

(57) ABSTRACT

A packet processing method, a device, and a system are disclosed. In the method, a first provider edge (PE) device receives a first virtual extensible local area network (VXLAN) packet through a first point-to-point (P2P) VXLAN tunnel between the first PE device and a third PE device A customer edge (CE) device is dual-homed to the first PE device and a second PE device respectively through a first Ethernet link and a second Ethernet link. The first PE device forwards the first VXLAN packet to the second PE device through a third P2P VXLAN tunnel from the first PE device to the second PE device when there is a fault on the first Ethernet link. The first Ethernet link connected to the first PE device and a link formed by the third P2P VXLAN tunnel and the second Ethernet link have a primary/secondary relationship.

15 Claims, 7 Drawing Sheets

(51) Int. Cl.
*H04L 45/60* (2022.01)
*H04L 45/00* (2022.01)

(56) References Cited

U.S. PATENT DOCUMENTS

| | | | |
|---|---|---|---|
| 10,212,075 B1* | 2/2019 | Lakshmikanthan | ............................ H04L 12/4679 |
| 10,644,987 B1* | 5/2020 | Lin | ..................... H04L 12/462 |
| 2013/0272114 A1 | 10/2013 | Ye | |
| 2016/0021015 A1* | 1/2016 | Thoria | ................ H04L 47/2483 370/235 |
| 2018/0006995 A1* | 1/2018 | Bickhart | ................. H04L 45/66 |
| 2018/0109400 A1* | 4/2018 | Brissette | ............. H04L 12/4633 |
| 2018/0359178 A1* | 12/2018 | Brissette | ............. H04L 12/4641 |
| 2019/0052559 A1* | 2/2019 | Velayudhan | ............. H04L 45/66 |
| 2019/0245779 A1* | 8/2019 | Jonnalagadda | ..... H04L 12/4641 |

FOREIGN PATENT DOCUMENTS

| | | |
|---|---|---|
| CN | 101651630 A | 2/2010 |
| CN | 101977150 A | 2/2011 |
| CN | 102546413 A | 7/2012 |
| CN | 102857418 A | 1/2013 |
| CN | 103634217 A | 3/2014 |
| CN | 104135420 A | 11/2014 |
| CN | 104753754 A | 7/2015 |
| CN | 105591800 A | 5/2016 |
| CN | 106878047 A | 6/2017 |
| CN | 106878183 A | 6/2017 |
| EP | 2528272 A4 | 4/2015 |
| EP | 3148127 A1 | 3/2017 |

* cited by examiner

PACKET PROCESSING METHOD, DEVICE, AND SYSTEM

CROSS-REFERENCE TO RELATED APPLICATIONS

This application is a continuation of International Application No. PCT/CN2018/110413, filed on Oct. 16, 2018, which claims priority to Chinese Patent Application No. 201710961377.7, filed on Oct. 17, 2017. The disclosures of the aforementioned applications are hereby incorporated by reference in their entireties.

TECHNICAL FIELD

This application relates to the field of communications technologies, and in particular, to a packet processing method, a device, and a system.

BACKGROUND

An Ethernet virtual private network (EVPN) is a layer 2 virtual private network (VPN) technology. The EVPN connects customer sites in different regions by using an Internet protocol (IP)/multiprotocol label switching (MPLS) bearer network, which is equivalent to that these customer sites are in a same local area network (LAN).

A virtual private wire service (VPWS) may be also referred to as a virtual leased line (VLL). The VPWS refers to a layer 2 service bearer technology used to simulate, as truly as possible in a packet switched network (PSN), basic behavior and a basic feature of services such as an asynchronous transfer mode (ATM), a frame relay (FR), the Ethernet, a low-speed time division multiplexing (TDM) circuit, and a synchronous optical network (SONET)/a synchronous digital hierarchy (SDH).

In an EVPN-VPWS network scenario, node devices no longer need to transmit a pseudo wire (PW) signal to each other. When a fault occurs on the node device or a link, the EVPN-VPWS network may implement relatively quick protection convergence.

In an actual application scenario, when a fault occurs on an attachment circuit (AC) side link of the EVPN-VPWS network, a provider edge (PE) device connected to the AC side link perceives the fault of an AC side port, and instructs, by using an EVPN route, a remote PE device to perform primary/secondary link switching. Because a fault perceiving process and an EVPN route notification process are relatively long, a packet loss occurs in data traffic sent by the remote PE device to the PE device connected to the AC side link.

SUMMARY

Embodiments of the application provide a packet processing method, a device, and a system, which are applied to an EVPN-VPWS network. When a fault is detected on an AC side link, a PE device connected to the faulty AC side link implements data traffic bypassing, which helps to reduce a packet loss of data traffic in a transmission process.

The embodiments of the application provide the following technical solutions.

In at least one embodiment, a packet processing method is provided. The method is applied to an EVPN-VPWS network, and the EVPN-VPWS network includes a first PE device, a second PE device and a third PE device. The first PE device receives a first virtual extensible local area network (VXLAN) packet through a first point-to-point (P2P) virtual extensible local area network (VXLAN) tunnel between the first PE device and the third PE device. The first VXLAN packet is a VXLAN packet sent by the third PE device to a customer edge (CE) device via the first P2P VXLAN tunnel, the first PE device, and a first Ethernet link. The CE device is dual-homed to the first PE device and the second PE device respectively through the first Ethernet link and a second Ethernet link. The first Ethernet link and the second Ethernet link form an Ethernet segment (ES). The first PE device forwards the first VXLAN packet to the second PE device through a third P2P VXLAN tunnel from the first PE device to the second PE device when the first PE device determines that there is a fault on the first Ethernet link. The first Ethernet link connected to the first PE device and a link formed by the third P2P VXLAN tunnel and the second Ethernet link have a primary/secondary relationship.

In at least one embodiment, in an EVPN-VPWS network scenario, when the first PE device perceives that an AC side link connected to the first PE device is faulty, the first PE device may forward the received first VXLAN packet from the third PE device through the established third P2P VXLAN tunnel. After receiving the first VXLAN packet, the second PE device sends the first VXLAN packet to a first CE device. Therefore, transient traffic bypassing is implemented, which helps to reduce a packet loss of data traffic in a transmission process.

In at least one embodiment, before the first PE device receives the first VXLAN packet through the first P2P VXLAN tunnel, the first PE device receives a first Ethernet auto-discovery per EVPN instance (EVI) route sent by the second PE device. The first Ethernet A-D per EVI route includes an Ethernet segment identifier (ESI) and an Ethernet tag identifier (Ethernet Tag ID). The ESI is used to indicate the ES, and the Ethernet Tag ID includes a local VPWS instance identifier and a remote VPWS instance identifier of the second PE device. When the ESI in the first Ethernet A-D per EVI route is the same as an ESI stored on the first PE device, the local VPWS instance identifier of the second PE device in the first Ethernet A-D per EVI route is the same as a local VPWS instance identifier of the first PE device, and the remote VPWS instance identifier of the second PE device in the first Ethernet A-D per EVI route is the same as a remote VPWS instance identifier of the first PE device, the first PE device establishes the third P2P VXLAN tunnel from the first PE device to the second PE device.

In at least one embodiment, the first PE device may automatically establish the third P2P VXLAN tunnel from the first PE device to the second PE device. Similarly, the second PE device may also automatically establish a fourth P2P VXLAN tunnel from the second PE device to the first PE device.

In at least one embodiment, the first PE device forwards the first VXLAN packet to the second PE device through a third P2P VXLAN tunnel when the first PE device determines that there is a fault on the first Ethernet link includes the following: When there is a fault on the first Ethernet link, the first PE device blocks a port of the first PE device for connecting to the first Ethernet link, and enables a port of the first PE device for connecting to the third P2P VXLAN tunnel; and the first PE device forwards the first VXLAN packet to the CE device through the third P2P VXLAN tunnel and the second Ethernet link.

In at least one embodiment, the method further includes the following: when the first Ethernet link is recovered from the fault, the first PE device enables the port of the first PE device for connecting to the first Ethernet link, and blocks the port of the first PE device for connecting to the third P2P VXLAN tunnel; and the first PE device receives a second VXLAN packet from the third PE device, and forwards the second VXLAN packet to the CE device through the first Ethernet link.

In at least one embodiment, when the fault on the first Ethernet link is removed, the first PE device may stop traffic bypassing in time.

In at least one embodiment, the first Ethernet link and the second Ethernet link are multi-chassis trunk (MC-Trunk) links. The first Ethernet link is a primary link, the second Ethernet link is a secondary link, the first PE device is a primary device, and the second PE device is a secondary device. When there is a fault on the first Ethernet link, the method further includes the following: The first PE device sends a first MC-Trunk packet to the second PE device, where the first MC-Trunk packet is used to notify the second PE device that the first Ethernet link is faulty; and the first PE device sends a second Ethernet A-D per EVI route to the third PE device, where the second Ethernet A-D per EVI route carries a P identifier and a B identifier, and the P identifier is not set and the B identifier is set, which is used to indicate that the first PE device is switched from a primary device to a secondary device.

In at least one embodiment, when the first Ethernet link is recovered from the fault, the method further includes the following: The first PE device sends a third Ethernet A-D per EVI route to the third PE device, where the third Ethernet A-D per EVI route carries a P identifier and a B identifier, and the P identifier is set and the B identifier is not set, which is used to indicate that the first PE device is switched from a secondary device to a primary device; the first PE device receives a third VXLAN packet through the fourth P2P VXLAN tunnel, where the third VXLAN packet is a VXLAN packet sent by the third PE device to the CE device via the second P2P VXLAN tunnel, the second PE device, and the second Ethernet link, and the fourth P2P VXLAN tunnel is a P2P VXLAN tunnel from the second PE device to the first PE device; and the first PE device forwards the third VXLAN packet to the CE device through the first Ethernet link.

Optionally, the first Ethernet link and the second Ethernet link are both primary links, and the first PE device and the second PE device are configured to receive traffic from the third PE device in a traffic balancing manner.

Further, optionally, the first PE device sends an Ethernet auto-discovery per Ethernet segment (Ethernet A-D per ES) withdrawal route to the third PE device through the first P2P VXLAN tunnel.

In at least one embodiment, a first PE device is provided, and the first PE device has functions of implementing behavior of the first PE device in the foregoing method. The functions may be implemented by hardware, or may be implemented by hardware by executing corresponding software. The hardware or the software includes one or more modules corresponding to the foregoing functions.

In a possible design, a structure of the first PE device includes a processor and an interface. The processor is configured to support the first PE device in performing corresponding functions in the foregoing method. The interface is configured to support communication between the first PE device and a second PE device, or is configured to support communication between the first PE device and a third PE device, and send information or an instruction related to the foregoing method to the second PE device or the third PE device, or receive information or an instruction related to the foregoing method from the second PE device or the third PE device. The first PE device may further include a memory. The memory is configured to be coupled to the processor, and store a program instruction and data for the first PE device.

In another possible design, the first PE device includes a processor, a transmitter, a random access memory, a read-only memory, and a bus. The processor is separately coupled to the transmitter, the random access memory, and the read-only memory by using the bus. When the first PE device needs to be run, a basic input/output system or a bootloader in an embedded system that is built into the read-only memory is used to lead a system to start, and lead the first PE device to enter a normal running state. After entering the normal running state, the first PE device runs an application program and an operating system in the random access memory, so that the processor performs embodiments of the method as described herein.

In at least one embodiment, a first PE device is provided, and the first PE device includes a main control board and an interface board, and may further include a switching board. The first PE device is configured to perform embodiments of the method as described herein. In at least one embodiment, the first PE device includes a module configured to perform embodiments of the method as described herein.

In at least one embodiment, a first PE device is provided, and the first PE device includes a controller and a first forwarding child device. The first forwarding child device includes an interface board, and may further include a switching board. In at least one embodiment, the first forwarding child device is configured to perform functions of the interface board, and may further perform functions of the switching board. The controller includes a receiver, a processor, a transmitter, a random access memory, a read-only memory, and a bus. The processor is separately coupled to the receiver, the transmitter, the random access memory, and the read-only memory by using the bus. When the controller needs to be run, a basic input/output system or a bootloader in an embedded system that is built into the read-only memory is used to lead a system to start, and lead the controller to enter a normal running state. In at least one embodiment, after entering the normal running state, the controller runs an application program and an operating system in the random access memory, so that the processor performs functions of the main control board.

In at least one embodiment, an EVPN-VPWS network system is provided. The EVPN-VPWS network system includes a first PE device as described herein.

In at least one embodiment, a computer storage medium is provided, and is configured to store a program, code, or an instruction used by the first PE device, and when a processor or a hardware device executes the program, the code, or the instruction, a function or an operation of the first PE device as described herein may be completed.

The embodiments of the application provide the packet processing method, the device, and the system by using the foregoing solutions. In the EVPN-VPWS network scenario, when the first PE device perceives that the AC side link connected to the first PE device is faulty, the first PE device may forward the received first VXLAN packet from the third PE device through the established third P2P VXLAN tunnel. After receiving the first VXLAN packet, the second PE device sends the first VXLAN packet to the first CE device. Therefore, transient traffic bypassing is implemented, which helps to reduce a packet loss of data traffic in a transmission process.

DESCRIPTION OF EMBODIMENTS

The following separately provides detailed descriptions by using specific embodiments.

In embodiments of the application, UP indicates that a port is enabled or available. In at least one embodiment, the port is allowed to send and receive a data packet. DOWN indicates that a port is disabled or unavailable. In at least one embodiment, the port is not allowed to send and receive a data packet.

Figure 1:
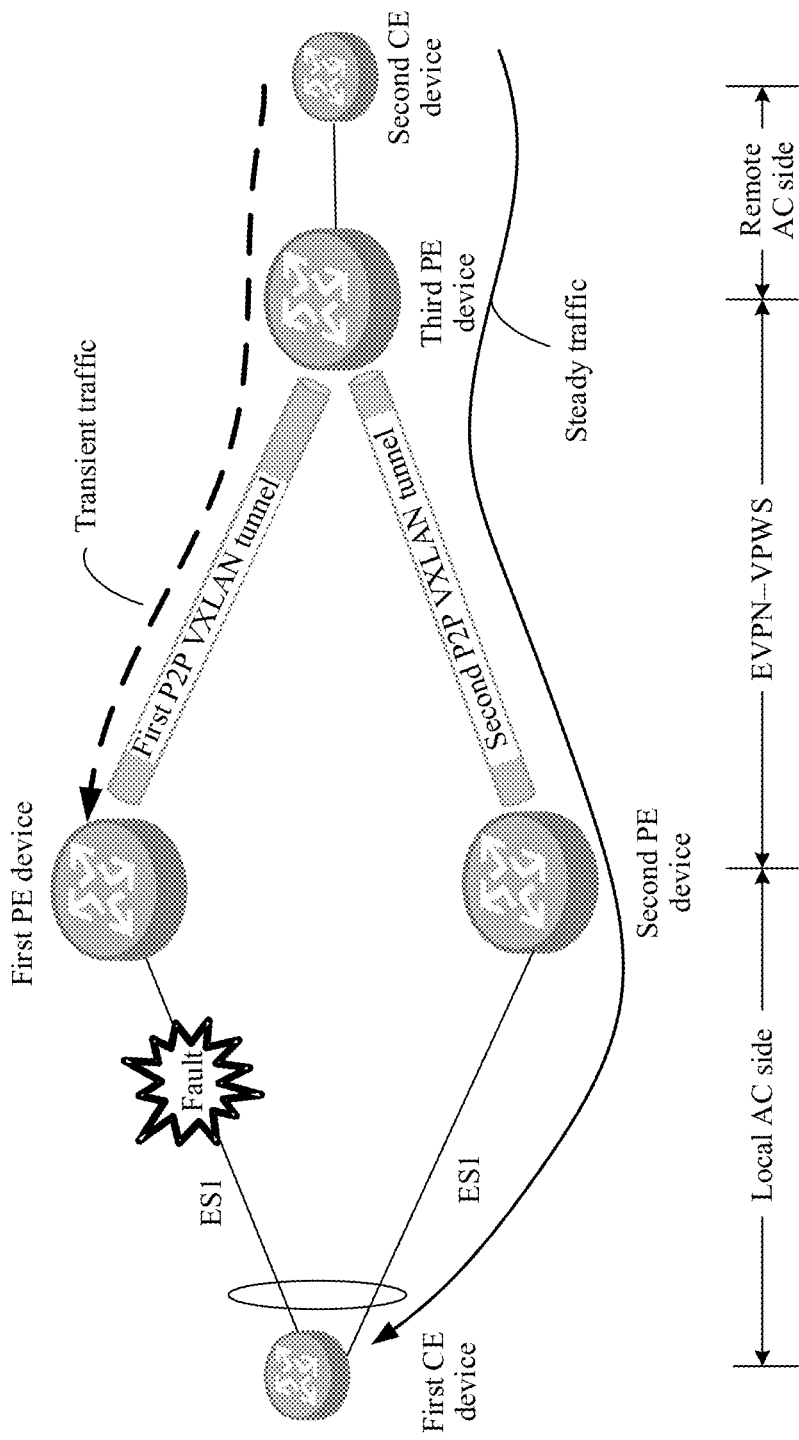
FIG. 1 is a schematic structural diagram of an EVPN-VPWS network according to an embodiment of the application.

FIG. 1 is a schematic structural diagram of an EVPN-VPWS network according to an embodiment of the application. As shown in FIG. 1, the EVPN-VPWS network includes a first PE device, a second PE device, and a third PE device. A first point-to-point (P2P) virtual extensible local area network (VXLAN) tunnel is established between the first PE device and the third PE device. A second P2P VXLAN tunnel is established between the second PE device and the third PE device. A P2P VXLAN tunnel is usually a two-way tunnel. The embodiments of the application describe traffic from the third PE device to the first PE device and the second PE device. Therefore, for ease of description, the first P2P VXLAN tunnel is a P2P VXLAN tunnel from the third PE device to the first PE device, and the second P2P VXLAN tunnel is a P2P VXLAN tunnel from the third PE device to the second PE device.

In the EVPN-VPWS network, any two PE devices are a pair of border gateway protocol (BGP) peers. The BGP peer may also be referred to as an EVPN peer. FIG. 1 is used as an example. The first PE device and the second PE device are a pair of BGP peers, the first PE device and the third PE device are a pair of BGP peers, and the second PE device and the third PE device are a pair of BGP peers. "A pair of BGP peers" may be understood as that one device is a BGP peer of the other device. For example, that the first PE device and the second PE device are a pair of BGP peers may be understood as that the first PE device is a BGP peer of the second PE device, or understood as that the second PE device is a BGP peer of the first PE device. The BGP peer may also be referred to as a BGP neighbor. Correspondingly, the EVPN peer may also be referred to as an EVPN neighbor. In the application, for ease of description, the BGP peer is used in all subsequent embodiments. The BGP peer is established by using an OPEN message specified in the BGP, and the established BGP peer is maintained by using a KEEPALIVE message. For an embodiment of the OPEN message and the KEEPALIVE message, refer to related descriptions in Internet Engineering Task Force (IETF) request for comments (RFC) 2858 and IETF RFC1771. In addition, a route reflector (RR) may be deployed in two end devices that establish the BGP peers, so that establishment of the BGP peers is completed by using the RR. In an embodiment of the application, a PE device may also be referred to as a network virtualization edge (NVE) device.

In the EVPN-VPWS network, the EVPN may support the VPWS in an IP/MPLS network. PE devices in the EVPN-VPWS network all run a VPWS instance. The VPWS instances in the PE devices and AC side ports of the PE devices have a one-to-one mapping relationship. Data traffic may be forwarded from an Ethernet segment on a source AC side to an Ethernet segment on a target AC side. An MPLS label is related to an Ethernet auto-discovery per EVPN instance (Ethernet A-D per EVI) route, and the MPLS label is used to forward the data traffic to the target AC side by the PE device. Therefore, the PE device can finish forwarding the traffic without needing to search a media access control (MAC) table. The EVI represents an EVPN instance. As shown in FIG. 1, the first PE device, the second PE device, and the third PE device all run a VPWS instance.

As shown in FIG. 1, a first customer edge (CE) device is dual-homed to the first PE device and the second PE device. In at least one embodiment, the first CE device separately communicates with the first PE device and the second PE device. The first CE device communicates with the first PE device through a first Ethernet link, and the first CE device communicates with the second PE device through a second Ethernet link. The first Ethernet link and the second Ethernet link are referred to as an AC side of the EVPN-VPWS network. For ease of description, the AC side is referred to as a local AC side. Similarly, a second CE device communicates with the third PE device. A link between the second CE device and the third PE device is also referred to as an AC side of the EVPN-VPWS network. For ease of description, the AC side is referred to as a remote AC side. Because the embodiment of the application describes a traffic forwarding process from the third PE device to the first PE device and the second PE device, the local AC side may also be referred to as the target AC side, and the remote AC side may also be referred to as the source AC side.

In the EVPN-VPWS network, the CE device and the PE device are connected by using an Ethernet link. In addition, all Ethernet links connected to a same CE device form one Ethernet segment (ES). Taking FIG. 1 as an example, the first CE device is dual-homed to the first PE device and the second PE device through two Ethernet links (namely, the first Ethernet link and the second Ethernet link), and the first Ethernet link and the second Ethernet link form one ES, which is indicated by an ES1 in FIG. 1. An Ethernet segment identifier (ESI) is used to identify a corresponding ES. Taking FIG. 1 as an example, ESI values of the ES1 of the first Ethernet link and the ES1 of the second Ethernet link are a same value. The ESI value of the ES1 is a non-zero value. The ESI includes a type field and an ESI value field, and the Type field is used to indicate a generation manner of the ESI. Two commonly used generation manners are Type 0 and Type 1, Type 0 indicates generation through manual configuration, and Type 1 indicates generation by using the Link Aggregation Control Protocol (LACP) that runs between a PE and a CE. A value of the ESI value field ranges from 0 to 0xFF, where "0x" indicates hexadecimal. For generation and configuration rules of the ES and the ESI, refer to descriptions in Chapter 5 in IETF RFC 7432.

In the EVPN-VPWS network shown in FIG. 1, optionally, the first CE device is dual-homed to the first PE device and the second PE device in the EVPN-VPWS network through an aggregated link multi-chassis trunk (MC-Trunk) link. The MC-Trunk link may also be referred to as an enhanced Trunk (E-trunk). In at least one embodiment, the MC-Trunk link includes two member aggregated link Ethernet-trunk (Eth-trunk) links. One Eth-Trunk link is located between the first CE device and the first PE device, and the other Eth-Trunk link is located between the first CE device and the second PE device. On the MC-Trunk link, active/standby states of the two member Eth-Trunk links may be configured. As shown in FIG. 1, the Eth-Trunk link between the first CE device and the first PE device is set as a primary link, or is referred to as a primary Eth-Trunk link; and the Eth-Trunk link between the first CE device and the second PE device is set as a secondary link, or is referred to as a secondary Eth-Trunk link. The first PE device and the second PE device determine, by running an MC-Trunk protocol to negotiate with each other, that a port of the first PE device for connecting to the first CE device is in an active state, and a port of the second PE device for connecting to the first CE device is in an inactive state.

In the EVPN-VPWS network shown in FIG. 1, the PE device may be a router or a layer 3 switch. The CE device may be a router, a switch, or a host. The PE device and the CE device in an embodiment of the application may be the PE device and the CE device defined in RFC 7432. When the CE device is a router or a switch, the CE device may be connected to one or more hosts. The host may be a physical device or a virtual machine (VM). The EVPN-VPWS shown in FIG. 1 may be applied to a plurality of scenarios. For example, the EVPN-VPWS is applied to a mobile bearer network, and a typical mobile bearer network is an Internet Protocol radio access network (IP RAN). In the mobile bearer network, the first CE device and the second CE device may be base transceiver stations (BTS), the first CE device and the second CE device may be connected to a base station controller (BSC) or a radio network controller (RNC), the first PE device and the second PE device may be cell site gateways (CSG), and the third PE device may be a radio network controller site gateway (RSG). For another example, the EVPN-VPWS is applied to a fixed network. In the fixed network, the first CE device and the second CE device may be user side sites, the first PE device and the second PE device may be digital subscriber line access multiplexers (DSLAM), and the third PE device may be a broadband access server (BAS).

In at least one embodiment, the first P2P VXLAN tunnel and the second P2P VXLAN tunnel may use a primary/secondary manner to transmit the data traffic sent by the third PE device to the first CE device. The first P2P VXLAN tunnel is a primary tunnel, and the second P2P VXLAN tunnel is a secondary tunnel. The third PE device sends the data traffic to the first PE device through the first P2P VXLAN tunnel and the first Ethernet link, and the second P2P VXLAN tunnel is in an idle state. When a fault occurs on the first Ethernet link, the active/standby states of the first P2P VXLAN tunnel and the second P2P VXLAN tunnel are switched. In a stable state, the third PE device sends the data traffic to the second PE device through the second P2P VXLAN tunnel and the second Ethernet link.

In at least one embodiment, the first P2P VXLAN tunnel and the second P2P VXLAN tunnel may use a traffic balancing manner to transmit the data traffic sent by the third PE device to the first CE device. The first P2P VXLAN tunnel and the second P2P VXLAN tunnel are both in an active state. The third PE device sends the data traffic to the first PE device and the second PE device by using a Hash algorithm in the traffic balancing manner through a first path formed by the first P2P VXLAN tunnel and the first Ethernet link and a second path formed by the second P2P VXLAN tunnel and the second Ethernet link. When a fault occurs on the first Ethernet link, the first P2P VXLAN tunnel is switched to an inactive state. In a stable state, the third PE device sends the data traffic to the second PE device through the second path.

That the first P2P VXLAN tunnel and the second P2P VXLAN tunnel use a primary/secondary manner to transmit the data traffic sent by the third PE device to the first CE device is used as an example to describe a case of the data traffic after a fault occurs on the first Ethernet link. As shown in FIG. 1, the first PE device perceives that a fault occurs on the first Ethernet link, and the first PE device and the second PE device perform primary/secondary switching based on the MC-Trunk protocol. The first PE device is switched to a secondary device, and the second PE device is switched to a primary device. The first PE device and the second PE device send an EVPN route to the third PE device, and notify the third PE device that the first PE device and the second PE device have performed primary/secondary switching. After receiving the EVPN route sent by the first PE device and/or the second PE device, the third PE device performs primary/secondary switching of the first P2P VXLAN tunnel and the second P2P VXLAN tunnel, so that the first P2P VXLAN tunnel is switched to a secondary tunnel, and the second P2P VXLAN tunnel is switched to a primary tunnel. Therefore, after the primary tunnel and the secondary tunnel are switched, the data traffic sent by the third PE device to the first CE device may be transmitted through the second P2P VXLAN tunnel, as shown by steady traffic in FIG. 1 (solid line arrow). However, a fault perceiving process and an EVPN route notification process are relatively long. Therefore, before primary/secondary switching of the first P2P VXLAN tunnel and the second P2P VXLAN tunnel is completed, the third PE device still sends the data traffic to the first PE device through the first P2P VXLAN tunnel, as shown by transient traffic in FIG. 1 (dashed line arrow). Because the first Ethernet link is faulty, the transient traffic cannot reach the first CE device, which causes a packet loss of the data traffic. The EVPN route includes an Ethernet auto-discovery per EVPN instance (Ethernet A-D per EVI) route. In combination with the foregoing descriptions, in a scenario in which the first P2P VXLAN tunnel and the second P2P VXLAN tunnel use the primary/secondary manner to transmit the data traffic sent by the third PE device to the first CE device, the steady traffic is traffic sent to the first CE device through the primary tunnel after the third PE device finishes performing primary/secondary switching of the first P2P VXLAN tunnel and the second P2P VXLAN tunnel, or traffic sent to the first CE device through the primary tunnel before the first Ethernet link is faulty; and the transient traffic is traffic sent to the first CE device through the primary tunnel after the first Ethernet link is faulty and before the third PE device finishes performing primary/secondary switching of the first P2P VXLAN tunnel and the second P2P VXLAN tunnel.

Similarly, when the first P2P VXLAN tunnel and the second P2P VXLAN tunnel use the traffic balancing manner to transmit the data traffic sent by the third PE device to the first CE device, before entering a stable state, the transient traffic transmitted by the first P2P VXLAN tunnel also has a packet loss. In a scenario in which the first P2P VXLAN tunnel and the second P2P VXLAN tunnel use the traffic balancing manner to transmit the data traffic sent by the third PE device to the first CE device, the steady traffic is traffic sent to the first CE device through the second P2P VXLAN tunnel after the first Ethernet link is faulty, or traffic sent to the first CE device through the first P2P VXLAN tunnel and the second P2P VXLAN tunnel before the first Ethernet link is faulty; and the transient traffic is traffic sent to the first CE device through the first P2P VXLAN tunnel after the first Ethernet link is faulty.

Figure 2:
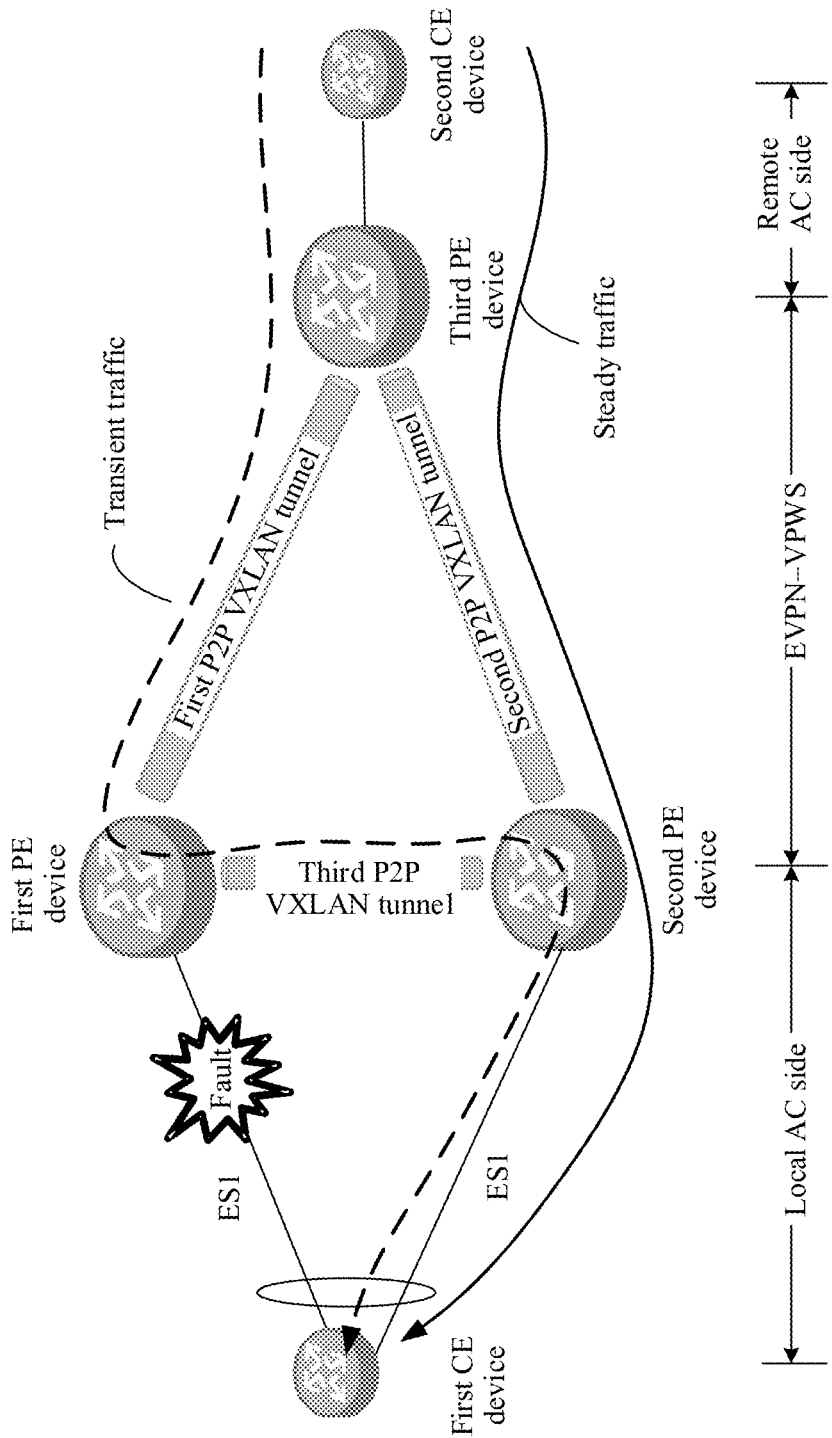
FIG. 2 is a schematic structural diagram of another EVPN-VPWS network according to an embodiment of the application.

FIG. 2 is a schematic structural diagram of another EVPN-VPWS network according to an embodiment of the application. Compared with the EVPN-VPWS network shown in FIG. 1, a third P2P VXLAN tunnel is deployed in the EVPN-VPWS network shown in FIG. 2. The third P2P VXLAN tunnel is established by the first PE device, and is a P2P VXLAN tunnel from the first PE device to the second PE device.

In FIG. 2, that the first P2P VXLAN tunnel and the second P2P VXLAN tunnel use the primary/secondary manner to transmit the data traffic sent by the third PE device to the first CE device is used as an example to describe a case of the data traffic after the first Ethernet link between the first CE device and the first PE device is faulty. As shown in FIG. 2, the first PE device perceives that a fault occurs on the first Ethernet link, and the first PE device and the second PE device perform primary/secondary switching based on the MC-Trunk protocol. The first PE device is switched to a secondary device, and the second PE device is switched to a primary device. The first PE device and the second PE device send an EVPN route to the third PE device, and notify the third PE device that the first PE device and the second PE device have performed primary/secondary switching. After receiving the EVPN route sent by the first PE device or the second PE device, the third PE device performs primary/secondary switching of the first P2P VXLAN tunnel and the second P2P VXLAN tunnel, so that the first P2P VXLAN tunnel is switched to a secondary tunnel, and the second P2P VXLAN tunnel is switched to a primary tunnel. Therefore, after the primary tunnel and the secondary tunnel are switched, the data traffic sent by the third PE device to the first CE device may be transmitted through the second P2P VXLAN tunnel, as shown by steady traffic in FIG. 2 (solid line arrow). After transient traffic (dashed line arrow) in FIG. 2 reaches the first PE device, the first PE device forwards the transient traffic to the second PE device through the third P2P VXLAN tunnel, so that the transient traffic can be sent to the first CE device via the second PE device. For a process in which the first PE device establishes the third P2P VXLAN tunnel and a process in which the first PE device forwards the transient traffic through the third P2P VXLAN tunnel, refer to descriptions in subsequent embodiments.

In at least one embodiment, in an EVPN-VPWS network scenario, when a PE device perceives that an AC side link connected to the PE device is faulty, the PE device may forward received data traffic from a remote PE device through an established P2P VXLAN tunnel, so that data traffic bypassing is implemented, which helps to reduce a packet loss of the data traffic in a transmission process. It should be understood that FIG. 2 exemplarily shows an EVPN-VPWS network including three PE devices, and in an actual scenario, a quantity of the PE devices may be more than three. For example, the EVPN-VPWS network includes a plurality of third PE devices. One of the third PE devices is a primary device, and all the other third PE devices are secondary devices.

Figure 3:
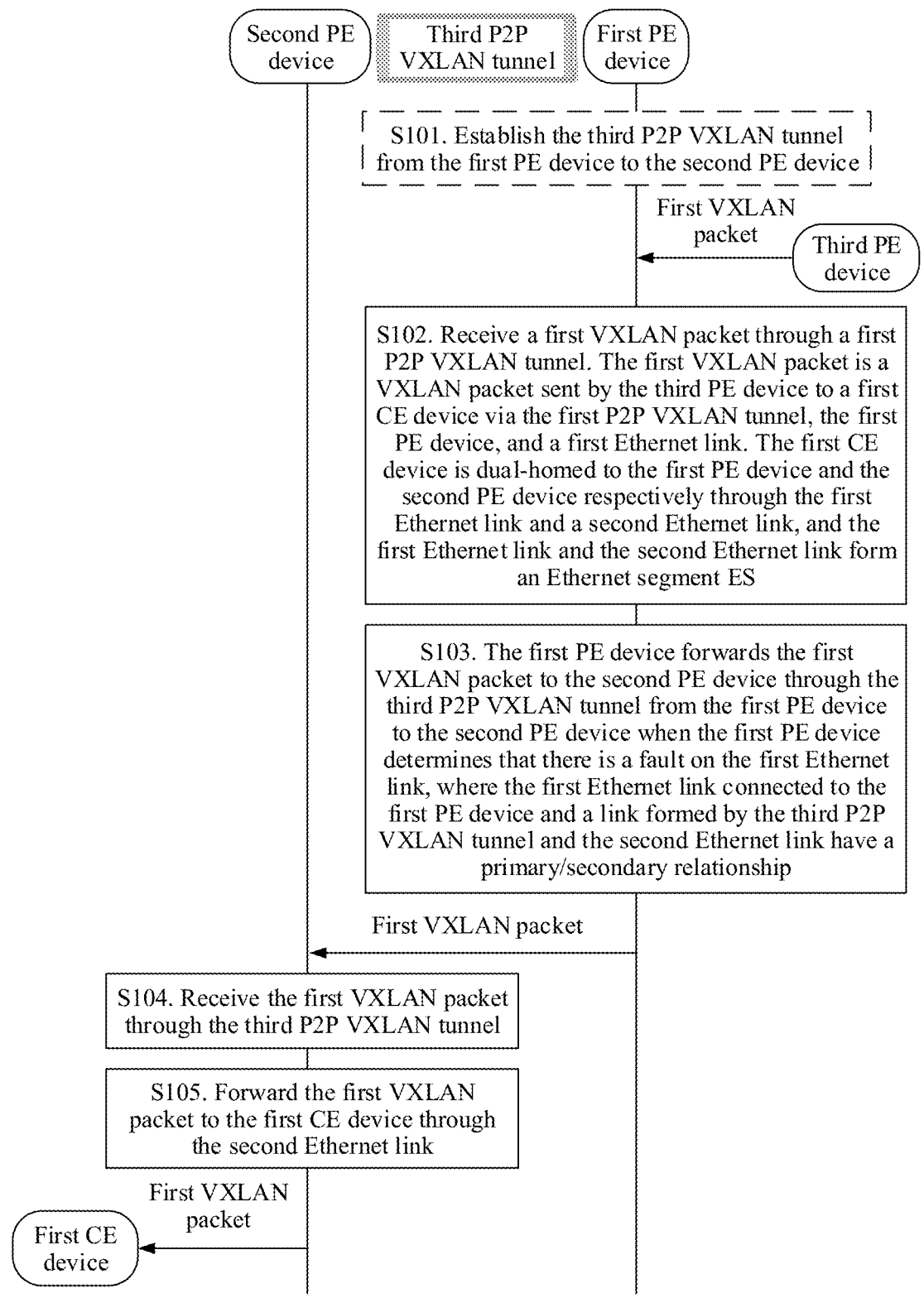
FIG. 3 is a flowchart of a packet processing method according to an embodiment of the application.

FIG. 3 is a flowchart of a packet processing method according to an embodiment of the application. The method shown in FIG. 3 may be applied to the EVPN-VPWS network shown in FIG. 2. The EVPN-VPWS network includes a first PE device, a second PE device, and a third PE device. The method shown in FIG. 3 includes S101 to S105.

S101. The first PE device establishes a third P2P VXLAN tunnel from the first PE device to the second PE device.

As shown in FIG. 2, a first P2P VXLAN tunnel is deployed between the first PE device and the third PE device, and a second P2P VXLAN tunnel is deployed between the second PE device and the third PE device. The first PE device may establish the third P2P VXLAN tunnel from the first PE device to the second PE device. The third P2P VXLAN tunnel may be established based on a physical link between the first PE device and the second PE device. For example, a physical link that can transmit a layer 3 service is deployed between the first PE device and the second PE device. The first PE device may receive, through the physical link, a first EVPN route sent by the second PE device. The first PE device receives the first EVPN route, and based on the first EVPN route, establishes the third P2P VXLAN tunnel from the first PE device to the second PE device on the physical link. When the first PE device determines that there is a fault on a first Ethernet link, the third P2P VXLAN tunnel is used to forward data traffic to the second PE device. The first Ethernet link is a link between the first PE device and a first CE device. Similarly, the second PE device may also receive, through the physical link, a second EVPN route sent by the first PE device, so that the second PE device establishes, based on the second EVPN route, a fourth P2P VXLAN tunnel from the second PE device to the first PE device on the physical link. When the second PE device determines that there is a fault on a second Ethernet link, the fourth P2P VXLAN tunnel is used to forward data traffic to the first PE device. The second Ethernet link is a link between the second PE device and the first CE device.

In the method shown in FIG. 3, S101 should be understood as an optional operation. For example, in a process of constructing the EVPN-VPWS network, the third P2P VXLAN tunnel already exists. In this case, the method shown in FIG. 3 may not include S101. For another example, when the method shown in FIG. 3 is performed for the first time, by performing S101, the first PE device establishes the third P2P VXLAN tunnel from the first PE device to the second PE device. Subsequently, when the method shown in FIG. 3 is performed again, because the third P2P VXLAN tunnel has been established, S101 does not need to be performed again.

Each of the first EVPN route and the second EVPN route includes an Ethernet A-D per EVI route. For a process in which the first PE device establishes, based on the Ethernet A-D per EVI route, the third P2P VXLAN tunnel and a process in which the second PE device establishes, based on the Ethernet A-D per EVI route, the fourth P2P VXLAN tunnel, refer to descriptions in subsequent embodiments of the application.

S102. The first PE device receives a first VXLAN packet through a first P2P VXLAN tunnel between the first PE device and the third PE device, where the first VXLAN packet is a VXLAN packet sent by the third PE device to the first CE device via the first P2P VXLAN tunnel, the first PE device, and the first Ethernet link, the first CE device is dual-homed to the first PE device and the second PE device respectively through the first Ethernet link and the second Ethernet link, and the first Ethernet link and the second Ethernet link form an Ethernet segment ES.

As shown in FIG. 2, a second CE device may send data traffic to the first CE device. After receiving the data traffic from the second CE device, the third PE device encapsulates the data traffic as the first VXLAN packet. Then, the third PE device may send the first VXLAN packet to the first CE device via the first P2P VXLAN tunnel, the first PE device, and the first Ethernet link. In a primary/secondary manner, the first P2P VXLAN tunnel is a primary tunnel, and the second P2P VXLAN tunnel is a secondary tunnel. Normally, the first P2P VXLAN tunnel is used to forward the first VXLAN packet, while the second P2P VXLAN tunnel is not used to forward the first VXLAN packet. In a traffic balancing manner, the first P2P VXLAN tunnel and the second P2P VXLAN tunnel are both in an active state. The third PE device forwards the first VXLAN packet through the first P2P VXLAN tunnel and the second P2P VXLAN tunnel based on a Hash algorithm.

As shown in FIG. 2, the first CE device is dual-homed to the first PE device and the second PE device through two Ethernet links, and the two Ethernet links form one ES, indicated by an ES 1 in FIG. 2. For explanations of the ES, refer to the forgoing descriptions. Details are not described herein again.

S103. The first PE device forwards the first VXLAN packet to the second PE device through the third P2P VXLAN tunnel from the first PE device to the second PE device when the first PE device determines that there is a fault on the first Ethernet link, where the first Ethernet link connected to the first PE device and a link formed by the third P2P VXLAN tunnel and the second Ethernet link have a primary/secondary relationship.

A link detection packet is deployed on the first Ethernet link. For example, the first CE device periodically sends the link detection packet to the first PE device through the first Ethernet link. When the first PE device determines that the link detection packet sent by the first CE device is not received within preset duration, the first PE device may determine that there is a fault on the first Ethernet link. The link detection packet includes a bidirectional forwarding detection (BFD) packet.

After determining that there is a fault on the first Ethernet link, the first PE device stops forwarding the first VXLAN packet to the first CE device through the first Ethernet link. Then, the first PE device forwards the first VXLAN packet to the second PE device through the third P2P VXLAN tunnel. Therefore, the third P2P VXLAN tunnel is used to implement bypassing of the first VXLAN packet sent by the third PE device to the first CE device via the first P2P VXLAN tunnel, the first PE device, and the first Ethernet link.

For example, the first Ethernet link connected to the first PE device and the link formed by the third P2P VXLAN tunnel and the second Ethernet link have a primary/secondary relationship. Normally, the first Ethernet link connected to the first PE device is in an active state, that is, a first port is in an UP state; and the link formed by the third P2P VXLAN tunnel and the second Ethernet link is in a standby state, that is, a second port of the first PE device for connecting to the third P2P VXLAN tunnel is in a DOWN state. Therefore, normally, the first VXLAN packet forwarded by the first P2P VXLAN tunnel may reach the first CE device through the first Ethernet link. When the first PE device determines that there is a fault on the first Ethernet link, primary/secondary switching occurs between the link formed by the third P2P VXLAN tunnel and the second Ethernet link, and the first Ethernet link. The first port is switched to a DOWN state, and the second port is switched to an UP state. In at least one embodiment, the first PE device blocks the first port, and enables the second port. Therefore, after the first VXLAN packet forwarded by the first P2P VXLAN tunnel reaches the first PE device, the first PE device forwards the first VXLAN packet to the second PE device through the third P2P VXLAN tunnel. In addition, because a port of the second PE device for connecting to the second Ethernet link is in an UP state, the first VXLAN packet may reach the first CE device through the second Ethernet link.

For example, when the first PE device determines that the first Ethernet link is recovered from the fault, primary/secondary switching occurs between the link formed by the third P2P VXLAN tunnel and the second Ethernet link, and the first Ethernet link. The first port is switched to an UP state, and the second port is switched to a DOWN state. In at least one embodiment, the first PE device enables the first port and blocks the second port. Therefore, the first PE device receives a second VXLAN packet from the third PE device through the first P2P VXLAN tunnel, and forwards the second VXLAN packet to the first CE device through the first Ethernet link.

Similarly, the second Ethernet link connected to the second PE device and a link formed by the fourth P2P VXLAN tunnel and the first Ethernet link have a primary/secondary relationship. The fourth P2P VXLAN tunnel is a P2P VXLAN tunnel from the second PE device to the first PE device.

S104. The second PE device receives the first VXLAN packet through the third P2P VXLAN tunnel.

S105. The second PE device forwards the first VXLAN packet to the first CE device through the second Ethernet link.

When the first PE device determines that there is a fault on the first Ethernet link, the first PE device forwards the first VXLAN packet to the second PE device through the third P2P VXLAN tunnel. The second PE device receives the first VXLAN packet. Then, the second PE device forwards the first VXLAN packet to the first CE device through the second Ethernet link.

In at least one embodiment, in an EVPN-VPWS network scenario, when the first PE device perceives that an AC side link connected to the first PE device is faulty, the first PE device may forward the received first VXLAN packet from the third PE device through the established third P2P VXLAN tunnel. After receiving the first VXLAN packet, the second PE device sends the first VXLAN packet to the first CE device. Therefore, transient traffic bypassing is implemented, which helps to reduce a packet loss of data traffic in a transmission process. It should be understood that the second PE device may also establish the fourth P2P VXLAN tunnel from the second PE device to the first PE device. Therefore, when the second PE device determines that there is a fault on the second Ethernet link, the second PE device forwards the data traffic to the first PE device through the fourth P2P VXLAN tunnel based on the method in the foregoing embodiment.

Figure 4:
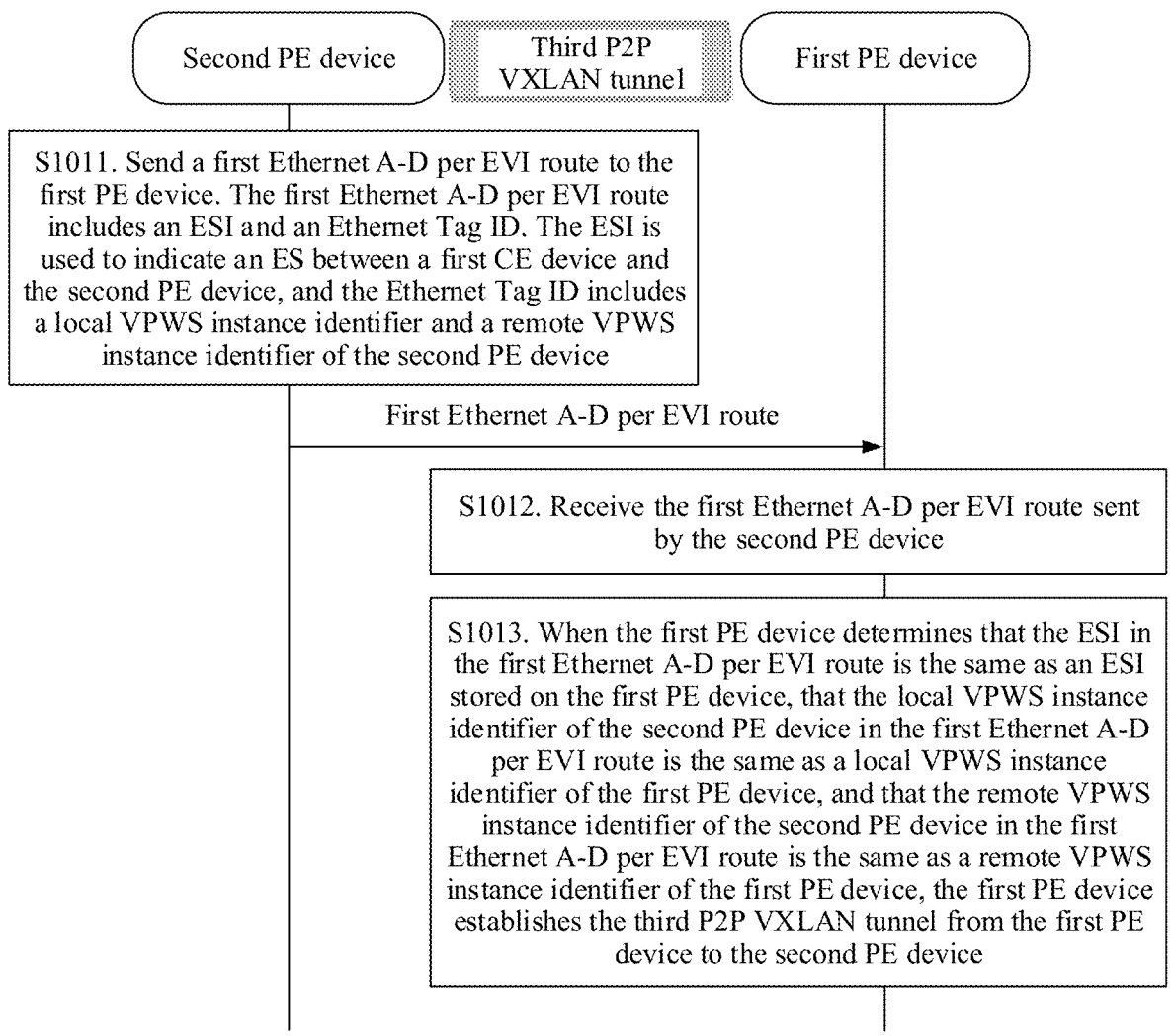
FIG. 4 is a flowchart of another packet processing method according to an embodiment of the application.

In at least one embodiment, the first PE device may implement establishment of the third P2P VXLAN tunnel based on an EVPN route. In at least one embodiment, the first PE device may implement the establishment of the third P2P VXLAN tunnel based on an Ethernet A-D per EVI route. The following uses FIG. 4 as an example to describe a process in which the first PE device establishes the third P2P VXLAN tunnel.

S1011. The second PE device sends a first Ethernet A-D per EVI route to the first PE device, where the first Ethernet A-D per EVI route includes an ESI and an Ethernet tag identifier (Ethernet tag ID), the ESI is used to indicate an ES between the first CE device and the second PE device, and the Ethernet Tag ID includes a local VPWS instance identifier and a remote VPWS instance identifier of the second PE device.

S1012. The first PE device receives the first Ethernet A-D per EVI route sent by the second PE device.

In the EVPN-VPWS network scenario, the first PE device and the second PE device may establish a P2P VXLAN tunnel in an automatic configuration manner. In addition, a process of establishing the third P2P VXLAN tunnel may be completed at an initialization stage of the EVPN-VPWS network. In at least one embodiment, the second PE device sends the first Ethernet A-D per EVI route to the first PE device, and the first PE device receives the first Ethernet A-D per EVI route.

The PE device in the EVPN-VPWS network may run a VPWS instance. Therefore, a VPWS instance identifier is configured on all PE devices in the EVPN-VPWS network. Taking FIG. 2 as an example, a local VPWS instance identifier and a remote VPWS instance identifier are configured on all of the first PE device, the second PE device, and the third PE device. The local VPWS instance identifier stored on the first PE device is used to indicate a VPWS instance run by the first PE device, and the local VPWS instance identifier stored on the second PE device is used to indicate a VPWS instance run by the second PE device. Because the first PE device and the second PE device are connected to the first CE device by using a same ES, the local VPWS instance run by the first PE device and the local VPWS instance run by the second PE device are the same, and the local VPWS instance identifier stored on the first PE device and the local VPWS instance identifier stored on the second PE device are the same, such as VPWS_11. The remote VPWS instance identifier (for example, VPWS_22) stored on the first PE device and the remote VPWS instance identifier stored on the second PE device are used to indicate a VPWS instance run by the third PE device. Correspondingly, the local VPWS instance identifier stored on the third PE device is used to indicate the VPWS instance run by the third PE device, and the remote VPWS instance identifier stored on the third PE device is used to indicate the VPWS instance run by the first PE device and the second PE device. For example, the local VPWS instance identifier stored on the third PE device is VPWS_22, and the remote VPWS instance identifier stored on the third PE device is VPWS_11. In this way, the first PE device, the second PE device, and the third PE device may implement the VPWS in the EVPN network.

The first Ethernet A-D per EVI route includes an ESI and an Ethernet Tag ID. Based on explanations in the foregoing description, the ESI is used to indicate an ES between the first CE device and the second PE device. The Ethernet Tag ID is used to carry the local VPWS instance identifier and the remote VPWS instance identifier of the second PE device. The first Ethernet A-D per EVI route may further include another type of field. For details, refer to a corresponding explanation in IETF RFC 7432.

S1013. When the first PE device determines that the ESI in the first Ethernet A-D per EVI route is the same as an ESI stored on the first PE device, that the local VPWS instance identifier of the second PE device in the first Ethernet A-D per EVI route is the same as a local VPWS instance identifier of the first PE device, and that the remote VPWS instance identifier of the second PE device in the first Ethernet A-D per EVI route is the same as a remote VPWS instance identifier of the first PE device, the first PE device establishes the third P2P VXLAN tunnel from the first PE device to the second PE device.

After receiving the first Ethernet A-D per EVI route, the first PE device decapsulates the first Ethernet A-D per EVI route, and extracts the ESI, the local VPWS instance identifier of the second PE device, and the remote VPWS instance identifier of the second PE device in the first Ethernet A-D per EVI route. Then, the first PE device compares the above information in the first Ethernet A-D per EVI route with the ESI, the local VPWS instance identifier, and the remote VPWS instance identifier that are stored on the first PE device.

If a comparison result shows that the above information in the first Ethernet A-D per EVI route is the same as the ESI, the local VPWS instance identifier, and the remote VPWS instance identifier that are stored on the first PE device, the first PE device may determine that the first PE device and the second PE device have ports connected to a same ES, are configured with a same local VPWS instance, and may both obtain VPWS traffic from the third PE device. The first PE device establishes the third P2P VXLAN tunnel from the first PE device to the second PE device. The first Ethernet link connected to the first PE device and the link formed by the third P2P VXLAN tunnel and the second Ethernet link have a primary/secondary relationship.

Based on the foregoing process from S1011 to S1013, the first PE device may automatically establish the third P2P VXLAN tunnel from the first PE device to the second PE device. Similarly, the second PE device may also automatically establish the fourth P2P VXLAN tunnel from the second PE device to the first PE device.

In at least one embodiment, optionally, the first CE device may be dual-homed to the first PE device and the second PE device in the EVPN-VPWS network through an MC-Trunk link. That the first P2P VXLAN tunnel and the second P2P VXLAN tunnel run in a primary/secondary manner is used as an example in the following to describe an embodiment in which the first PE device processes data traffic sent by the third PE device to the first CE device when the first PE device determines that there is a fault on the first Ethernet link.

As shown in FIG. 2, the first Ethernet link and the second Ethernet link are MC-Trunk links, the first Ethernet link is a primary link, the second Ethernet link is a secondary link, the first PE device is a primary device, the second PE device is a secondary device, and when the first PE device determines that there is a fault on the first Ethernet link, the method further includes the following operations.

S2011. The first PE device sends a first MC-Trunk packet to the second PE device, where the first MC-Trunk packet is used to notify the second PE device that the first Ethernet link is faulty.

The first CE device may be dual-homed to the first PE device and the second PE device through the MC-Trunk link. In addition, active/standby states of two Ethernet links are configured on the MC-Trunk link. When there is a fault on the first Ethernet link, the first PE device may perceive the fault by using a link detection packet (for example, the BFD packet mentioned in the foregoing description). The first PE device triggers primary/secondary switching of the MC-Trunk link, switches the first Ethernet link to a secondary link, and sends the first MC-Trunk packet to the second PE device. The first MC-Trunk packet is used to notify the second PE device that the first Ethernet link is faulty. The second PE device receives the first MC-Trunk packet, and based on the first MC-Trunk packet, determines that the first Ethernet link is faulty. After determining that the first Ethernet link is faulty, the second PE device switches the second Ethernet link to a primary link. Therefore, when the first Ethernet link is faulty, the first PE device and the second PE device complete primary/secondary switching on the MC-Trunk.

S2012. The first PE device sends a second Ethernet A-D per EVI route to the third PE device. The second Ethernet A-D per EVI route carries a P identifier and a B identifier. The P identifier is not set and the B identifier is set, which is used to indicate that the first PE device is switched from a primary device to a secondary device.

After perceiving that the first Ethernet link is faulty and switching the first Ethernet link to a secondary link, the first PE device sends the second Ethernet A-D per EVI route to the third PE device. In at least one embodiment, an Ethernet Tag ID in the second Ethernet A-D per EVI route carries the local VPWS instance identifier and the remote VPWS instance identifier of the first PE device. The second Ethernet A-D per EVI route further carries the P identifier and the B identifier. The P identifier is set to 1, which is used to indicate that a PE device releasing the P identifier is a primary device, and the B identifier is set to 1, which is used to indicate that a PE device releasing the B identifier is a secondary device. For example, in a multihoming single-active scenario, the first PE device sends a second Ethernet A-D per EVI route in which P=1 (indicating: set) and B=0 (indicating: not set) to indicate that the first PE device is a primary device; and the first PE device sends a second Ethernet A-D per EVI route in which P=0 (indicating: not set) and B=1 (indicating: set) to indicate that the first PE device is a secondary device. Therefore, after perceiving that the first Ethernet link is faulty and switching the first Ethernet link to a secondary link, the first PE device sends the second Ethernet A-D per EVI route carrying P=0 and B=1 to the third PE device, so that the first PE device requests the third PE device to switch the first PE device from a primary device to a secondary device. After receiving the second Ethernet A-D per EVI route, the third PE device triggers primary/secondary switching of the first PE device and the second PE device.

Based on the description in S2011, after receiving the first MC-Trunk packet, and based on the first MC-Trunk packet, determining that the first Ethernet link is faulty, the second PE device switches the second Ethernet link to a primary link. Therefore, the second PE device sends an Ethernet A-D per EVI route that carries P=1 and B=0 to the third PE device to indicate that the second PE device requests the third PE device to switch the second PE device from a secondary device to a primary device. After receiving any Ethernet A-D per EVI route from the first PE device and the second PE device, the third PE device triggers primary/secondary switching of the first PE device and the second PE device.

Optionally, the second Ethernet A-D per EVI route carries EVPN layer 2 attributes extended community. The EVPN layer 2 attributes extended community includes control flags, and the control flags are used to carry a P identifier and a B identifier. The control flags may further include a C identifier. The C identifier is set to 1 to indicate that an EVPN packet sent to the first PE device needs to carry a control word.

By using S2011 and 2012, the first P2P VXLAN tunnel and the second P2P VXLAN tunnel may complete primary/secondary switching. In a primary/secondary switching process, the third P2P VXLAN tunnel is used to implement transient traffic bypassing, which helps to reduce a packet loss of the data traffic in a transmission process.

Optionally, when the first P2P VXLAN tunnel and the second P2P VXLAN tunnel run in a primary/secondary manner, and the first PE device determines that the first Ethernet link is recovered from the fault, the method further includes:

S3011. The first PE device sends a third Ethernet A-D per EVI route to the third PE device. The third Ethernet A-D per EVI route carries a P identifier and a B identifier. The P identifier is set and the B identifier is not set, which is used to indicate that the first PE device is switched from a secondary device to a primary device.

By using the process in S2011 and S2012, after entering a stable state, the data traffic sent by the third PE device to the first CE device is forwarded through the second P2P VXLAN tunnel. In at least one embodiment, the second P2P VXLAN tunnel is a primary tunnel, and the first P2P VXLAN tunnel is a secondary tunnel. Further, when the first PE device detects that a link detection packet between the first PE device and the first CE device is recovered, for example, when the first PE device receives the BFD packet from the first CE device again, the first PE device may determine that the fault of the first Ethernet link is removed. The first PE device sends the third Ethernet A-D per EVI route to the third PE device. The third Ethernet A-D per EVI route carries P=1 and B=0 identifiers, indicating that the first PE device is switched from a secondary device to a primary device. After receiving the third Ethernet A-D per EVI route, the third PE device triggers primary/secondary switching of the first PE device and the second PE device, to switch the first PE device to a primary device and switch the second PE device to a secondary device. In at least one embodiment, the first PE device further sends an MC-Trunk packet to the second PE device to notify the second PE device that the fault of the first Ethernet link is removed.

S3012. The first PE device receives a third VXLAN packet through a fourth P2P VXLAN tunnel. The third VXLAN packet is a VXLAN packet sent by the third PE device to the CE device via the second P2P VXLAN tunnel, the second PE device, and the second Ethernet link. The fourth P2P VXLAN tunnel is a P2P VXLAN tunnel from the second PE device to the first PE device.

S3013. The first PE device forwards the third VXLAN packet to the first CE device through the first Ethernet link.

In at least one embodiment, in a process in which the first PE device and the second PE device perceive that the fault of the first Ethernet link is removed and a primary/secondary switching process of the first P2P VXLAN tunnel and the second P2P VXLAN tunnel, the second P2P VXLAN tunnel may alternatively have transient traffic, which is indicated by the third VXLAN packet. In at least one embodiment, the second PE device may forward the third VXLAN packet to the first PE device through the fourth P2P VXLAN tunnel. The first PE device receives the third VXLAN packet, and forwards the third VXLAN packet to the first CE device through the first Ethernet link. The fourth P2P VXLAN tunnel is a P2P VXLAN tunnel from the second PE device to the first PE device.

The process from S3011 to S3013 implements transient traffic bypassing in a fault removal process, which helps to reduce a packet loss of the data traffic in a transmission process.

Optionally, the first P2P VXLAN tunnel and the second P2P VXLAN tunnel may use a traffic balancing manner to transmit the data traffic sent by the third PE device to the first CE device. In the traffic balancing manner, the first Ethernet link and the second Ethernet link are both primary links. The first PE device and the second PE device are configured to receive traffic from the third PE device in the traffic balancing manner.

In at least one embodiment, when the first PE device determines that the first Ethernet link is faulty, the data traffic sent by the third PE device based on the Hash algorithm through the first P2P VXLAN tunnel is transmitted to the second PE device through the third P2P VXLAN tunnel.

Further, optionally, the first PE device sends an Ethernet auto-discovery per Ethernet segment (Ethernet A-D per ES) withdrawal route to the third PE device through the first P2P VXLAN tunnel. After receiving the Ethernet A-D per ES withdrawal route, the third PE device deletes a route of the first PE device. After deleting the route of the first PE device, the third PE device no longer sends the data traffic based on the Hash algorithm through the first P2P VXLAN tunnel, and instead, sends the data traffic through the second P2P VXLAN tunnel. Therefore, bypassing of transient traffic generated in a process in which the first PE device generates and sends the Ethernet A-D per ES withdrawal route, and the third PE device processes the Ethernet A-D per ES withdrawal route may be implemented by using the third P2P VXLAN tunnel, which helps to reduce a packet loss of the data traffic in a transmission process.

Figure 5:
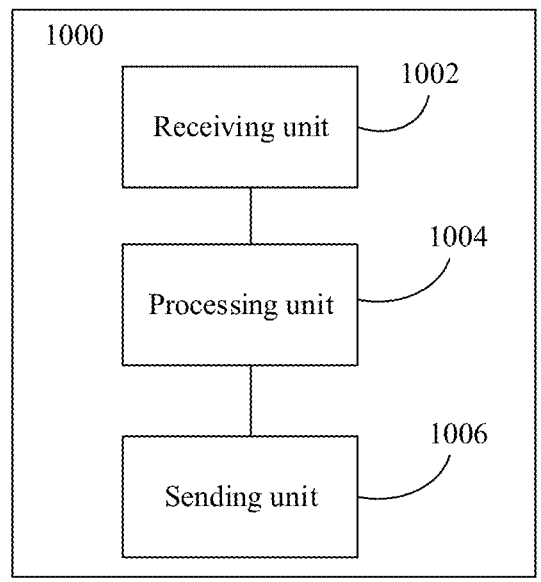
FIG. 5 is a schematic structural diagram of a first PE device according to an embodiment of the application.

FIG. 5 is a schematic structural diagram of a first PE device 1000 according to an embodiment of the application. The first PE device 1000 shown in FIG. 5 may perform corresponding operations performed by the first PE device in the method of the foregoing embodiment. The first PE device is deployed in an EVPN-VPWS network, and the EVPN-VPWS network further includes a second PE device and a third PE device. As shown in FIG. 5, the first PE device 1000 includes a receiving unit 1002, a processing unit 1004, and a sending unit 1006.

The receiving unit 1002 is configured to receive a first VXLAN packet through a first P2P VXLAN tunnel between the first PE device and the third PE device, where the first VXLAN packet is a VXLAN packet sent by the third PE device to a CE device via the first P2P VXLAN tunnel, the first PE device, and a first Ethernet link, the CE device is dual-homed to the first PE device and the second PE device respectively through the first Ethernet link and a second Ethernet link, and the first Ethernet link and the second Ethernet link form an ES;

the processing unit 1004 is configured to determine that there is a fault on the first Ethernet link; and the sending unit 1006 is configured to forward the first VXLAN packet to the second PE device through a third P2P VXLAN tunnel from the first PE device to the second PE device, where the first Ethernet link connected to the first PE device and a link formed by the third P2P VXLAN tunnel and the second Ethernet link have a primary/secondary relationship.

Optionally, before the receiving unit 1002 receives the first VXLAN packet through the first P2P VXLAN tunnel, the receiving unit 1002 is further configured to receive a first Ethernet A-D per EVI route sent by the second PE device. The first Ethernet A-D per EVI route includes an ESI and an Ethernet Tag ID. The ESI is used to indicate an ES between the CE device and the second PE device. The Ethernet Tag ID includes a local VPWS instance identifier and a remote VPWS instance identifier of the second PE device. When the processing unit 1004 determines that the ESI in the first Ethernet A-D per EVI route is the same as an ESI stored on the first PE device, that the local VPWS instance identifier of the second PE device in the first Ethernet A-D per EVI route is the same as a local VPWS instance identifier of the first PE device, and that the remote VPWS instance identifier of the second PE device in the first Ethernet A-D per EVI route is the same as a remote VPWS instance identifier of the first PE device, the processing unit 1004 is further configured to establish the third P2P VXLAN tunnel from the first PE device to the second PE device.

Optionally, that the processing unit 1004 determines that there is a fault on the first Ethernet link includes: when the processing unit 1004 determines that there is a fault on the first Ethernet link, the processing unit 1004 is further configured to block a port of the first PE device for connecting to the first Ethernet link, and enable a port of the first PE device for connecting to the third P2P VXLAN tunnel.

Optionally, when the processing unit 1004 determines that the first Ethernet link is recovered from the fault, the processing unit 1004 is further configured to enable the port of the first PE device for connecting to the first Ethernet link, and block the port of the first PE device for connecting to the third P2P VXLAN tunnel; the receiving unit 1002 is further configured to receive a second VXLAN packet from the third PE device; and the sending unit 1006 is further configured to forward the second VXLAN packet to the CE device through the first Ethernet link.

Optionally, the first Ethernet link and the second Ethernet link are MC-Trunk links. The first Ethernet link is a primary link, the second Ethernet link is a secondary link, the first PE device is a primary device, and the second PE device is a secondary device. When the processing unit 1004 determines that there is a fault on the first Ethernet link, the sending unit 1006 is further configured to send a first MC-Trunk packet to the second PE device, where the first MC-Trunk packet is used to notify the second PE device that the first Ethernet link is faulty. The sending unit 1006 is further configured to send a second Ethernet A-D per EVI route to the third PE device, where the second Ethernet A-D per EVI route carries a P identifier and a B identifier, and the P identifier is not set and the B identifier is set, which is used to indicate that the first PE device is switched from a primary device to a secondary device.

Optionally, when the processing unit 1004 determines that the first Ethernet link is recovered from the fault, the sending unit 1006 is further configured to send a third Ethernet A-D per EVI route to the third PE device, where the third Ethernet A-D per EVI route carries a P identifier and a B identifier, and the P identifier is set and the B identifier is not set, which is used to indicate that the first PE device is switched from a secondary device to a primary device. The receiving unit 1002 is further configured to receive a third VXLAN packet through a fourth P2P VXLAN tunnel, where the third VXLAN packet is a VXLAN packet sent by the third PE device to the CE device via the second P2P VXLAN tunnel, the second PE device, and the second Ethernet link, and the fourth P2P VXLAN tunnel is a P2P VXLAN tunnel from the second PE device to the first PE device. The sending unit 1006 is further configured to forward the third VXLAN packet to the CE device through the first Ethernet link.

Optionally, the first Ethernet link and the second Ethernet link are both primary links, and the first PE device and the second PE device are configured to receive traffic from the third PE device in a traffic balancing manner.

Optionally, the sending unit 1006 is further configured to send an Ethernet auto-discovery per Ethernet segment Ethernet A-D per ES withdrawal route to the third PE device through the first P2P VXLAN tunnel.

The first PE device shown in FIG. 5 may perform corresponding operations performed by the first PE device in the method of the foregoing embodiment. When the first PE device is applied to an EVPN-VPWS network scenario, transient traffic bypassing is implemented, which helps to reduce a packet loss of data traffic in a transmission process. It should be understood that the structure in FIG. 5 is also applicable to the second PE device in FIG. 2.

Figure 6:
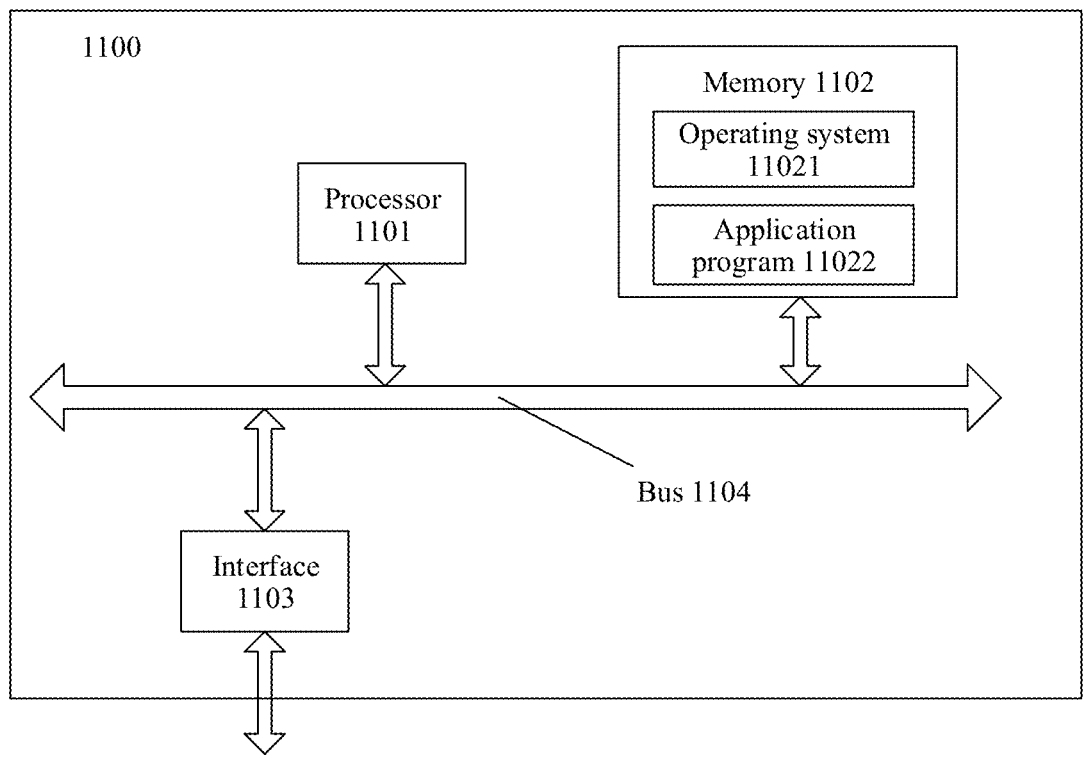
FIG. 6 is a schematic structural diagram of hardware of a first PE device according to an embodiment of the application.

FIG. 6 is a schematic structural diagram of hardware of a first PE device 1100 according to an embodiment of the application. The first PE device 1100 shown in FIG. 6 may perform corresponding operations performed by the first PE device in the method of the foregoing embodiment.

As shown in FIG. 6, the first PE device 1100 includes a processor 1101, a memory 1102, an interface 1103, and a bus 1104. The interface 1103 may be implemented in a wireless or wired manner. In at least one embodiment, the interface 1103 may be a network adapter. The processor 1101, the memory 1102, and the interface 1103 are connected by using the bus 1104.

The interface 1103 may include a transmitter and a receiver, and is configured to send and receive information between the first PE device and the second PE device in the foregoing embodiment, or is configured to send and receive information between the first PE device and the third PE device in the foregoing embodiment. For example, the interface 1103 is configured to receive a VXLAN packet from the third PE device, and forward the VXLAN packet to the second PE device. For example, the interface 1103 is configured to support processes of S102 and S103 in FIG. 3. The processor 1101 is configured to perform processing performed by the first PE device in the foregoing embodiment. For example, the processor 1101 is configured to determine that there is a fault on a first Ethernet link, and may be further configured to establish a third P2P VXLAN tunnel from the first PE device to the second PE device; and/or is applied to another process of the technology described in the specification. For example, the processor 1101 is configured to support processes of S101 and S103 in FIG. 3. The memory 1102 includes an operating system 11021 and an application program 11022, and is configured to store a program, code, or an instruction. When executing the program, the code, or the instruction, the processor or a hardware device may complete a processing process related to the first PE device in the method embodiment. Optionally, the memory 1102 may include a read-only memory (ROM) and a random access memory (RAM). The ROM includes a basic input/output system (BIOS) or an embedded system, and the RAM includes an application program and an operating system. When the first PE device 1100 needs to be run, the BIOS or a bootloader in the embedded system that is built into the ROM is used to lead a system to start, and lead the first PE device 1100 to enter a normal running state. After entering the normal running state, the first PE device 1100 runs the application program and the operating system in the RAM, so as to complete the processing process related to the first PE device in the method embodiment.

It may be understood that FIG. 6 merely shows a simplified design of the first PE device 1100. In actual application, the first PE device may include any quantity of interfaces, processors, or memories. In addition, only the first PE device is used as an example for description in an embodiment. It should be understood that the second PE device or more PE devices have same functions as the first PE device. Details are not described herein again.

Figure 7:
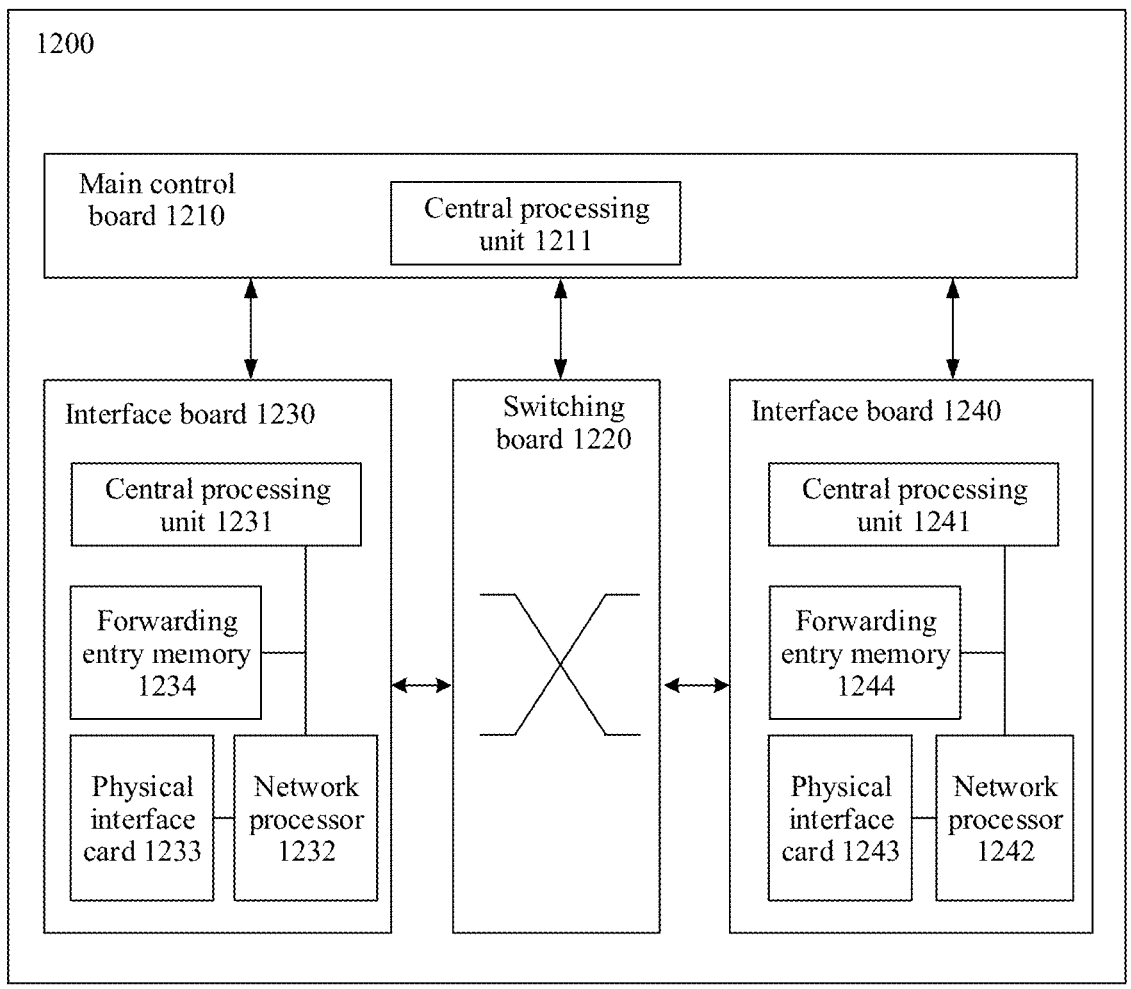
FIG. 7 is a schematic structural diagram of hardware of another first PE device according to an embodiment of the application.

FIG. 7 is a schematic structural diagram of hardware of another first PE device 1200 according to an embodiment of the application. The first PE device 1200 shown in FIG. 7 may perform corresponding operations performed by the first PE device in the method of the foregoing embodiment.

As shown in FIG. 7, the first PE device 1200 includes a main control board 1210, an interface board 1230, a switching board 1220, and an interface board 1240. The main control board 1210, the interface board 1230, the interface board 1240, and the switching board 1220 are connected to a platform backboard by using a system bus for interworking. The main control board 1210 is configured to complete functions such as system management, device maintenance, and protocol processing. The switching board 1220 is configured to complete data exchange between interface boards (the interface board is also referred to as a line card or a service board). The interface board 1230 and the interface board 1240 are configured to provide various service interfaces (for example, a POS interface, a GE interface, and an ATM interface), and forward a data packet.

The interface board 1230 may include a central processing unit 1231, a forwarding entry memory 1234, a physical interface card 1233, and a network processor 1232. The central processing unit 1231 is configured to control and manage the interface board 1230, and communicate with a central processing unit 1211 on the main control board 1210. The forwarding entry memory 1234 is configured to store a forwarding entry. The physical interface card 1233 is configured to receive and send traffic. The network processor 1232 is configured to control the physical interface card 1233 to send and receive the traffic based on the forwarding entry.

In at least one embodiment, the physical interface card 1233 receives a VXLAN packet from a third PE device, and sends the VXLAN packet to the central processing unit 1211 on the main control board 1210 via the central processing unit 1231. The central processing unit 1211 is configured to obtain the VXLAN packet. The physical interface card 1233 is further configured to forward the VXLAN packet to a second PE device.

The central processing unit 1211 is further configured to determine that there is a fault on a first Ethernet link. The central processing unit 1211 is further configured to establish a third P2P VXLAN tunnel from the first PE device to the second PE device.

The central processing unit 1211 is further configured to process the VXLAN packet. The central processing unit 1211 sends the VXLAN packet to the physical interface card 1233 via the central processing unit 1231. The physical interface card 1233 sends the VXLAN packet to the second PE device.

The central processing unit 1231 is further configured to control the network processor 1232 to obtain the forwarding entry in the forwarding entry memory 1234. In addition, the central processing unit 1231 is further configured to control the network processor 1232 to receive and send traffic through the physical interface card 1233.

As shown in FIG. 7, an interface board 1240 includes a central processing unit 1241, a forwarding entry memory 1244, a physical interface card 1243 and a network processor 1242. It should be understood that an operation on the interface board 1240 is consistent with an operation on the interface board 1230 in an embodiment of the invention. For brevity, details are not described. It should be understood that the first PE device 1200 in an embodiment may correspond to functions and/or operations implemented in the foregoing method embodiments. Details are not described herein again. In addition, only the first PE device is used as an example for description in an embodiment. It should be understood that the second PE device or more PE devices have same functions as the first PE device. Details are not described herein again.

In addition, it should be noted that there may be one or more main control boards. When there are a plurality of main control boards, a primary main control board and a secondary main control board may be included. There may be one or more interface boards, and the first PE device with a stronger data processing capability provides more interface boards. There may be one or more physical interface cards on the interface board. There may be no switching board, or there may be one or more switching boards. When there are a plurality of switching boards, load sharing and redundancy backup may be jointly implemented by the plurality of switching boards. In a centralized forwarding architecture, the first PE device may not need a switching board, and the interface board implements a service data processing function of the entire system. In a distributed forwarding architecture, the first PE device may have at least one switching board, and data exchange between a plurality of interface boards is implemented by using the switching board, so as to provide a large-capacity data exchange and processing capability. Therefore, a data access and processing capability of the first PE device in the distributed architecture is better than that of a device in the centralized architecture. Use of a specific architecture depends on a specific networking deployment scenario. This is not limited herein.

Figure 8:
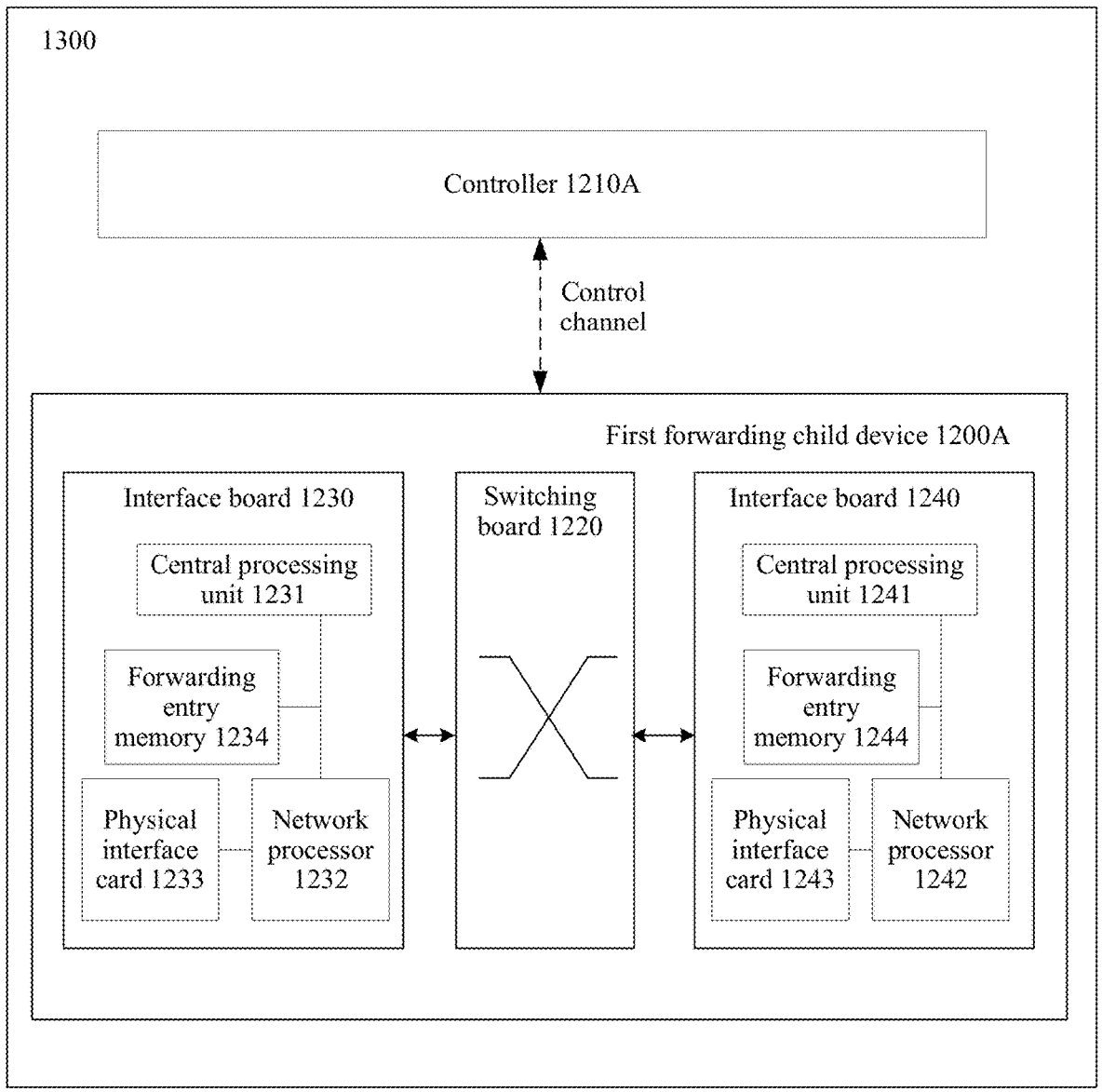
FIG. 8 is a schematic structural diagram of hardware of still another first PE device according to an embodiment of the application.

FIG. 8 is a schematic structural diagram of hardware of still another first PE device 1300 according to an embodiment of the application. The first PE device 1300 shown in FIG. 8 may perform corresponding operations performed by the first PE device in the method of the foregoing embodiment.

Such a product form of the first PE device 1300 is applicable to a network architecture (for example, software-defined networking (SDN)) in which control and forwarding are separated. In the SDN, the main control board 1210 of the first PE device 1200 shown in FIG. 7 is separated from the device, and forms a new independent physical device (e.g., a controller 1210A shown in FIG. 8), and remaining components form another independent physical device (e.g., a first forwarding child device 1200A shown in FIG. 8). The controller 1210A interacts with the first forwarding child device 1200A by using a control channel protocol. The control channel protocol may be the OpenFlow protocol, the path computation element communication protocol (PCEP), the BGP, the interface to the routing system (I2RS), or the like. That is, compared with the embodiment corresponding to FIG. 7, the first PE device 1300 in an embodiment includes the controller 1210A and the first forwarding child device 1200A that are separated from the first PE device 1200.

The controller 1210A may be implemented based on a general-purpose physical server or a dedicated hardware structure. In a design example, the controller includes a receiver, a processor, a transmitter, a RAM, a ROM, and a bus (not shown in the figure). The processor is separately coupled to the receiver, the transmitter, the RAM, and the ROM by using the bus. When the controller needs to be run, a BIOS or a bootloader in an embedded system that is built into the ROM is used to lead a system to start, and lead the controller to enter a normal running state. After entering a normal running state, the controller runs an application program and an operating system in the RAM, so that the processor performs all functions and operations of the main control board 1210 in FIG. 7.

The first forwarding child device 1200A may be implemented based on a dedicated hardware structure. The function and the structure of the first forwarding child device 1200A are consistent with those of the interface board 1230, the interface board 1240, and the switching board 1220 in FIG. 7, so as to perform a corresponding function and operation. Alternatively, the first forwarding child device 1200A may be a virtual first forwarding child device implemented based on a general-purpose physical server and a network functions virtualization (NFV) technology, and the virtual first forwarding child device is a virtual router. In a scenario of the virtual first forwarding child device, the interface board, the switching board, and the processor that are included in the first forwarding child device in the foregoing embodiment of the physical first forwarding child device can be considered as an interface resource, a network resource, and a processing resource that are allocated by the physical first forwarding child device to the virtual first forwarding child device by using a general-purpose physical server in a virtual environment. For details of implementing functions or operations of the first forwarding child device by using the general-purpose physical server, or implementing functions or operations of the first forwarding child device by using the general-purpose physical server and the NFV technology, refer to the embodiment of FIG. 6.

It should be understood that, the controller 1210A and the first forwarding child device 1200A in the first PE device 1300 in an embodiment may implement various functions and operations implemented by the first PE device in the method embodiments. For brevity, details are not described herein again. In addition, only the first PE device is used as an example for description in an embodiment. It should be understood that the second PE device or more PE devices have same functions as the first PE device. Details are not described herein again.

In addition, an embodiment of the application provides a computer storage medium, configured to store a computer software instruction used by the first PE device, and the computer software instruction includes a program designed for performing the foregoing method embodiment.

An embodiment of the application further includes an EVPN-VPWS network system. The EVPN-VPWS network system includes a first PE device. The first PE device is the first PE device in FIG. 5, FIG. 6, FIG. 7, or FIG. 8.

Method or algorithm operations described in combination with the content disclosed in the application may be implemented by hardware, or may be implemented by a processor by executing a software instruction. The software instruction may be formed by a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium, and may write information into the storage medium. Certainly, the storage medium may be a component of the processor. The processor and the storage medium may be located in the ASIC. In addition, the ASIC may be located in user equipment. Certainly, the processor and the storage medium may exist in the user equipment as discrete components.

One of ordinary skill in the art should be aware that in the foregoing one or more examples, functions described in the application may be implemented by hardware, software, firmware, or any combination thereof. When embodiments of the invention are implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a general-purpose or dedicated computer.

Objectives, technical solutions, and beneficial effects of the application have been described in further detail with reference to the specific embodiments. It should be understood that the foregoing descriptions are not limited to the specific embodiments of the application.

What is claimed is:

1. A packet processing method, wherein the method is applied to an Ethernet virtual private network-virtual private wire service (EVPN-VPWS) network, the EVPN-VPWS network comprises a first provider edge (PE) device, a second PE device, and a third PE device, and the method comprises:

receiving, by the first PE device, a first virtual extensible local area network (VXLAN) packet through a first point-to-point virtual extensible local area network (P2P VXLAN) tunnel between the first PE device and the third PE device, wherein the first VXLAN packet is a VXLAN packet sent by the third PE device to a customer edge (CE) device via the first P2P VXLAN tunnel, the first PE device, and a first Ethernet link, the CE device is dual-homed to the first PE device and the second PE device respectively through the first Ethernet link and a second Ethernet link, and the first Ethernet link and the second Ethernet link form an Ethernet segment (ES); and forwarding, by the first PE device, the first VXLAN packet to the second PE device through a third P2P VXLAN tunnel from the first PE device to the second PE device when the first PE device determines a fault on the first Ethernet link, wherein the first Ethernet link connected to the first PE device and a link formed by the third P2P VXLAN tunnel and the second Ethernet link have a primary/secondary relationship, wherein before the receiving, by the first PE device, the first VXLAN packet through the first P2P VXLAN tunnel, the method further comprises:

receiving, by the first PE device, a first Ethernet autodiscovery per EVPN instance (Ethernet A-D per EVI) route sent by the second PE device, wherein the first Ethernet A-D per EVI route comprises an Ethernet segment identifier (ESI) and an Ethernet tag identifier (Ethernet Tag ID), the ESI is used to indicate the ES, and the Ethernet Tag ID comprises a local virtual private wire service (VPWS) instance identifier and a remote VPWS instance identifier of the second PE device; and after determining that the ESI in the first Ethernet A-D per EVI route is the same as an ESI stored on the first PE device, the local VPWS instance identifier of the second PE device in the first Ethernet A-D per EVI route is the same as a local VPWS instance identifier of the first PE device, and the remote VPWS instance identifier of the second PE device in the first Ethernet A-D per EVI route is the same as a remote VPWS instance identifier of the first PE device, establishing, by the first PE device, the third P2P VXLAN tunnel from the first PE device to the second PE device.

2. The method according to claim 1, wherein the forwarding, by the first PE device, the first VXLAN packet to the second PE device through the third P2P VXLAN tunnel:

when the fault is on the first Ethernet link, blocking, by the first PE device, a port of the first PE device for connecting to the first Ethernet link, and enabling a port of the first PE device for connecting to the third P2P VXLAN tunnel; and forwarding, by the first PE device, the first VXLAN packet to the CE device through the third P2P VXLAN tunnel and the second Ethernet link.

3. The method according to claim 2, further comprising:

when the first Ethernet link is recovered from the fault, enabling, by the first PE device, the port of the first PE device for connecting to the first Ethernet link, and blocking the port of the first PE device for connecting to the third P2P VXLAN tunnel; and receiving, by the first PE device, a second VXLAN packet from the third PE device, and forwarding the second VXLAN packet to the CE device through the first Ethernet link.

4. The method according to claim 1, wherein the first Ethernet link and the second Ethernet link are multi-chassis trunk (MC-Trunk) links, the first Ethernet link is a primary link, the second Ethernet link is a secondary link, the first PE device is a primary device, the second PE device is a secondary device, and when the fault is on the first Ethernet link, the method further comprises:

sending, by the first PE device, a first MC-Trunk packet to the second PE device, wherein the first MC-Trunk packet is used to notify the second PE device that the first Ethernet link is faulty; and sending, by the first PE device, a second Ethernet A-D per EVI route to the third PE device, wherein the second Ethernet A-D per EVI route carries a P identifier and a B identifier, and the P identifier is not set and the B identifier is set to indicate that the first PE device is switched from the primary device to the secondary device.

5. The method according to claim 4, wherein when the first Ethernet link is recovered from the fault, the method further comprises:

sending, by the first PE device, a third Ethernet A-D per EVI route to the third PE device, wherein the third Ethernet A-D per EVI route carries a P identifier and a B identifier, and the P identifier is set and the B identifier is not set to indicate that the first PE device is switched from the secondary device to the primary device;

receiving, by the first PE device, a third VXLAN packet through a fourth P2P VXLAN tunnel, wherein the third VXLAN packet is a VXLAN packet sent by the third PE device to the CE device via a second P2P VXLAN tunnel, the second PE device, and the second Ethernet link, and the fourth P2P VXLAN tunnel is a P2P VXLAN tunnel from the second PE device to the first PE device; and forwarding, by the first PE device, the third VXLAN packet to the CE device through the first Ethernet link.

6. The method according to claim 1, wherein the first Ethernet link and the second Ethernet link are primary links, and the first PE device and the second PE device are configured to receive traffic from the third PE device in a traffic balancing manner.

7. The method according to claim 6, further comprising:
sending, by the first PE device, an Ethernet auto-discovery per Ethernet segment (Ethernet A-D per ES) withdrawal route to the third PE device through the first P2P VXLAN tunnel.

8. A first provider edge (PE) device, wherein the first PE device is deployed in an Ethernet virtual private network-virtual private wire service (EVPN-VPWS) network, the EVPN-VPWS network comprises a second PE device and a third PE device, and the first PE device comprises:
a receiver configured to receive a first virtual extensible local area network (VXLAN) packet through a first point-to-point virtual extensible local area network (P2P VXLAN) tunnel between the first PE device and the third PE device, wherein the first VXLAN packet is a VXLAN packet sent by the third PE device to a customer edge (CE) device via the first P2P VXLAN tunnel, the first PE device, and a first Ethernet link, the CE device is dual-homed to the first PE device and the second PE device respectively through the first Ethernet link and a second Ethernet link, and the first Ethernet link and the second Ethernet link form an Ethernet segment (ES);
a processor, configured to determine a fault on the first Ethernet link; and
a transmitter, configured to forward the first VXLAN packet to the second PE device through a third P2P VXLAN tunnel from the first PE device to the second PE device, wherein the first Ethernet link connected to the first PE device and a link formed by the third P2P VXLAN tunnel and the second Ethernet link have a primary/secondary relationship, wherein before the receiver receives the first VXLAN packet through the first P2P VXLAN tunnel,
the receiver is further configured to receive a first Ethernet auto-discovery per EVPN instance (Ethernet A-D per EVI) route sent by the second PE device, wherein the first Ethernet A-D per EVI route comprises an Ethernet segment identifier (ESI) and an Ethernet tag identifier (Ethernet Tag ID), the ESI is used to indicate the ES, and the Ethernet Tag ID comprises a local virtual private wire service VPWS instance identifier and a remote VPWS instance identifier of the second PE device; and
after the processor determines that the ESI in the first Ethernet A-D per EVI route is the same as an ESI stored on the first PE device, that the local VPWS instance identifier of the second PE device in the first Ethernet A-D per EVI route is the same as a local VPWS instance identifier of the first PE device, and that the remote VPWS instance identifier of the second PE device in the first Ethernet A-D per EVI route is the same as a remote VPWS instance identifier of the first PE device, the processor is further configured to establish the third P2P VXLAN tunnel from the first PE device to the second PE device.

9. The first PE device according to claim 8, wherein when the processor determines a fault on the first Ethernet link, the processor is further configured to block a port of the first PE device for connecting to the first Ethernet link, and enable a port of the first PE device for connecting to the third P2P VXLAN tunnel.

10. The first PE device according to claim 9, wherein when the processor determines that the first Ethernet link is recovered from the fault, the processor is further configured to enable the port of the first PE device for connecting to the first Ethernet link, and block the port of the first PE device for connecting to the third P2P VXLAN tunnel;
the receiver is further configured to receive a second VXLAN packet from the third PE device; and
the transmitter is further configured to forward the second VXLAN packet to the CE device through the first Ethernet link.

11. The first PE device according to claim 8, wherein the first Ethernet link and the second Ethernet link are multi-chassis trunk (MC-Trunk) links, the first Ethernet link is a primary link, the second Ethernet link is a secondary link, the first PE device is a primary device, the second PE device is a secondary device, and when the processor determines the fault on the first Ethernet link,
the transmitter is further configured to send a first MC-Trunk packet to the second PE device, wherein the first MC-Trunk packet is used to notify the second PE device that the first Ethernet link is faulty; and
the transmitter is further configured to send a second Ethernet A-D per EVI route to the third PE device, wherein the second Ethernet A-D per EVI route carries a P identifier and a B identifier, and the P identifier is not set and the B identifier is set to indicate that the first PE device is switched from the primary device to the secondary device.

12. The first PE device according to claim 11, wherein when the processor determines that the first Ethernet link is recovered from the fault,
the transmitter is further configured to send a third Ethernet A-D per EVI route to the third PE device, wherein the third Ethernet A-D per EVI route carries a P identifier and a B identifier, and the P identifier is set and the B identifier is not set to indicate that the first PE device is switched from the secondary device to the primary device;
the receiver is further configured to receive a third VXLAN packet through a fourth P2P VXLAN tunnel, wherein the third VXLAN packet is a VXLAN packet sent by the third PE device to the CE device via a second P2P VXLAN tunnel, the second PE device, and the second Ethernet link, and the fourth P2P VXLAN tunnel is a P2P VXLAN tunnel from the second PE device to the first PE device; and
the transmitter is further configured to forward the third VXLAN packet to the CE device through the first Ethernet link.

13. The first PE device according to claim 8, wherein the first Ethernet link and the second Ethernet link are primary links, and the first PE device and the second PE device are configured to receive traffic from the third PE device in a traffic balancing manner.

14. The first PE device according to claim 13, wherein
the transmitter is further configured to send an Ethernet auto-discovery per Ethernet segment (Ethernet A-D per ES) withdrawal route to the third PE device through the first P2P VXLAN tunnel.

15. An Ethernet virtual private network-virtual private wire service (EVPN-VPWS) network system, wherein the EVPN-VPWS network comprises a first provider edge (PE) device, and the first PE device is the first PE device according to claim 8.

* * * * *